US007383431B2

(12) United States Patent
Takamizawa et al.

(10) Patent No.: US 7,383,431 B2
(45) Date of Patent: Jun. 3, 2008

(54) CONTROL SYSTEM AND METHOD FOR REWRITING DATA IN A FLASH MEMORY AND A DATA STORAGE MEDIUM IN WHICH A PROGRAM IS STORED FOR REWRITING DATA IN A FLASH MEMORY

(75) Inventors: Yuji Takamizawa, Nagano-ken (JP); Go Hiroike, Matsumoto (JP)

(73) Assignee: Seiko Epson Corporation (JP)

( * ) Notice: Subject to any disclaimer, the term of this patent is extended or adjusted under 35 U.S.C. 154(b) by 613 days.

(21) Appl. No.: 10/460,459

(22) Filed: Jun. 11, 2003

(65) Prior Publication Data
US 2004/0039872 A1 Feb. 26, 2004

(30) Foreign Application Priority Data
Jun. 11, 2002 (JP) ............................. 2002-170633
Aug. 30, 2002 (JP) ............................. 2002-255270

(51) Int. Cl.
*G06F 9/00* (2006.01)
(52) U.S. Cl. ......................................................... 713/2
(58) Field of Classification Search .................... 713/1, 713/2
See application file for complete search history.

(56) References Cited
U.S. PATENT DOCUMENTS

| 5,473,775 | A | 12/1995 | Sakai et al. |
| 5,522,076 | A | 5/1996 | Dewa et al. |
| 5,802,551 | A | 9/1998 | Komatsu et al. |
| 5,983,312 | A | 11/1999 | Komatsu et al. |
| 6,125,424 | A | 9/2000 | Komatsu et al. |
| 6,161,163 | A | 12/2000 | Komatsu et al. |
| 6,205,548 | B1 * | 3/2001 | Hasbun .......................... 713/2 |
| 6,298,421 | B1 | 10/2001 | Minamizawa et al. |
| 6,330,634 | B1 * | 12/2001 | Fuse et al. ................... 711/103 |
| 6,401,221 | B1 * | 6/2002 | Sun et al. ....................... 714/36 |
| 6,442,067 | B1 | 8/2002 | Chawla et al. |

(Continued)

FOREIGN PATENT DOCUMENTS

EP 0 910 020 A1 4/1999

(Continued)

OTHER PUBLICATIONS

The European Search Report citing the above references.

*Primary Examiner*—Rehana Perveen
*Assistant Examiner*—Eric Chang
(74) *Attorney, Agent, or Firm*—Anderson Kill & Olick, PC

(57) ABSTRACT

A memory control system and method for controlling the rewriting of data in a flash memory which includes a boot memory portion having a plurality of sectors including a boot sector for storing cold boot data, N other boot sectors for storing other boot data and having a program process in each of said N boot sectors for rewriting data in boot sectors other than itself and other than said cold boot sector based upon the boot data stored therein. The control system further includes a boot data evaluation unit for recognizing which of the boot sectors has been most recently updated with update data and which program process is to be used for rewriting data in boot sectors other than itself and a rewrite unit for rewriting data.

9 Claims, 12 Drawing Sheets

U.S. PATENT DOCUMENTS

| | | | |
|---|---|---|---|
| 6,539,474 B2 * | 3/2003 | Matsuura | 713/2 |
| 6,560,703 B1 * | 5/2003 | Goodman | 713/2 |
| 6,615,404 B1 * | 9/2003 | Garfunkel et al. | 717/173 |
| 6,789,158 B2 * | 9/2004 | Takahashi | 711/103 |
| 6,981,136 B2 * | 12/2005 | Fuse et al. | 713/2 |
| 2001/0008011 A1 | 7/2001 | Oba | |
| 2001/0011347 A1 | 8/2001 | Narayanaswamy et al. | |
| 2001/0020263 A1 | 9/2001 | Matsuura | |
| 2002/0002652 A1 | 1/2002 | Takahashi | |
| 2002/0029314 A1 | 3/2002 | Minamizawa et al. | |

FOREIGN PATENT DOCUMENTS

| | | |
|---|---|---|
| EP | 0 936 548 A1 | 8/1999 |
| EP | 1 008 928 A1 | 6/2000 |
| JP | 6-324857 | 11/1994 |
| JP | 7-105691 | 4/1995 |
| JP | 08-069376 | 3/1996 |
| JP | 10-171659 | 6/1998 |
| JP | 10-283171 | 10/1998 |
| JP | 10-320984 | 12/1998 |
| JP | 10-333913 | 12/1998 |
| JP | 11-212791 | 6/1999 |
| JP | 2971267 | 8/1999 |
| JP | 11-249968 | 9/1999 |
| JP | 11-265282 | 9/1999 |
| JP | 11-282759 | 10/1999 |
| JP | 11-297082 | 10/1999 |
| JP | 2000-066960 | 3/2000 |
| JP | 2000-122909 | 4/2000 |
| JP | 2000-122935 | 4/2000 |
| JP | 2000-330850 | 11/2000 |
| JP | 2001-195241 | 7/2001 |
| JP | 2001-209543 | 8/2001 |
| JP | 2001-331323 | 11/2001 |
| JP | 2001-331325 | 11/2001 |
| JP | 2001-331379 | 11/2001 |
| JP | 2002-073360 | 3/2002 |
| WO | WO 98/934169 | 8/1998 |

* cited by examiner (a)

(b)

(a)

(b)

(a)

(b)

CONTROL SYSTEM AND METHOD FOR REWRITING DATA IN A FLASH MEMORY AND A DATA STORAGE MEDIUM IN WHICH A PROGRAM IS STORED FOR REWRITING DATA IN A FLASH MEMORY

BACKGROUND OF THE INVENTION

1. Field of the Invention

The present invention relates to a control system and method for rewriting data in a flash memory storing both a boot program and a main program as firmware of an electronic device and to a data storage medium in which a program is stored for rewriting data in a flash memory.

2. Description of Related Art

The boot program and the main program of the firmware in printers, scanners, and other such electronic devices are separate programs typically stored in flash memory. In a printer, for example, the main program controlling the normal operation of the printer, i.e., the printing process, and font data are stored in a main memory portion of the flash memory. The program for running the boot program to initialize the printer, and a program for controlling a memory rewrite process for writing to the flash memory are stored in a boot memory portion of the flash memory. The rewrite process is used to rewrite to the main program and/or rewrite font data in the main memory portion. The main memory portion and the boot memory portion are each composed of one or more sectors. A "sector" as the term is used herein means a unit of batch-erasable memory of the flash memory device.

In the conventional rewrite process, rewriting data stored in the boot memory portion (i.e., the boot data) requires three download operations because the programs stored in a boot sector prohibit rewriting in the boot memory portion.

FIG. 12 shows the movement of data with this conventional rewrite process. The rewrite process for flash memory sectors other than the boot memory portion is run by the boot data stored in the boot memory portion, and the boot data is rewritten with newly downloaded boot block rewrite data.

The boot block rewrite data is acquired in a first download process by the boot data, the data stored in the main memory portion (the main data) is erased, and the acquired boot block rewrite data is written to the main memory portion (I in FIG. 12).

The new boot data is then acquired by the boot block rewrite data in a second download step, the boot memory portion is erased, and the new boot data is written to the boot memory portion (II in FIG. 12).

New main data, if any, is then acquired in a third download step by the new boot data, the boot block rewrite data is erased from the main memory portion, and the acquired new main data is then written to the main memory portion (FIG. 12, III). If it is not necessary to update the main data, the old main data (the data that was erased in the first step) is acquired again in the third download step and written to the main memory portion.

As described above, rewriting data stored in the boot memory portion of the flash memory cannot be completed without three download operations. The rewrite process is therefore complicated, error-prone, and time-consuming.

SUMMARY OF THE INVENTION

The present invention provides a control system and method that simplifies rewriting flash memory and reduces the time required and the incidence of errors in the rewrite process while also preventing the electronic device employing the flash memory from becoming unbootable. This invention also includes a data storage medium which has a program stored therein for executing the steps of the method of the present invention.

More specifically in the control system of the present invention the flash memory (101) includes a boot memory portion having a plurality of sectors including a first boot sector (201) for storing cold boot data, N other boot sectors (202, 203) for storing other boot data, wherein N≧2 and a main memory portion (204) having one or more sectors for storing main data with the control system comprising:

a boot data evaluation unit (301) for selecting one or more sectors in flash memory which are to be rewritten based upon boot update evaluation data stored in each of the N other boot sectors (202, 203) with said boot data evaluation unit (301) being adapted to recognize which of the boot sectors has been most recently updated with update data; and a rewrite unit (302, 303) responsive to said boot data evaluation unit (301) for rewriting data stored in the main memory portion and/or in a boot sector other than the boot sector which has been most recently updated.

The method of this invention is executable by the CPU in an electronic device. The method can be stored as a program on various different storage media selected from the class consisting of: Compact Discs (CD), floppy disks, hard disks, magneto-optical discs, Digital Versatile Discs (DVD), magnetic tape, and semiconductor memory modules.

Broadly stated the method of the present invention controls the rewriting of data in a flash memory (101) having a boot memory portion divided into a plurality of sectors including a first boot sector (201) for storing cold boot data, N other boot sectors (202, 203) for storing other boot data wherein N≧2, and a main memory portion (204) having one or more sectors for storing main memory; with the method comprising the steps of:

(a) selecting one or more sectors in the flash memory to receive update data based upon boot update evaluation data stored in the N other boot sectors;

(b) recognizing which of the N other boot sectors has been most recently updated with update data; and (c) rewriting data stored in the main memory portion (204) and/or a boot sector other than the boot sector recognized in step (b) as the sector which has been most recently updated with update data.

BRIEF DESCRIPTION OF THE DRAWINGS

Other objects and attainments together with a fuller understanding of the invention will become apparent and appreciated by referring to the following detailed description and claims taken in conjunction with the accompanying drawings, in which:

DESCRIPTION OF THE PREFERRED EMBODIMENTS

Figure 1:
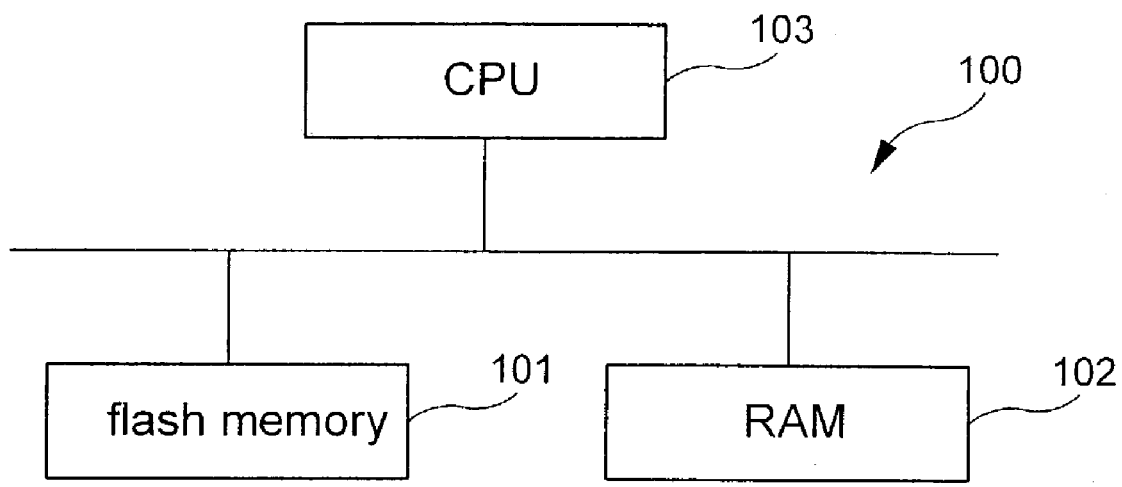
FIG. 1 shows the hardware configuration of the control system of the present invention.

FIG. 1 shows the hardware configuration of the memory rewrite control system 100 of the present invention comprising a rewritable flash memory 101 divided into sectors, i.e., units of batch-erasable storage area, a read/write RAM 102, and a CPU 103 for controlling the electronic device containing the control system 100.

The flash memory 101 stores font data, for example, a main program for controlling the normal operation of the electronic device containing the control system 100, and a boot program for controlling the startup process of the electronic device and for rewriting data in flash memory 101.

The one or more sectors storing the boot program are referred to below as the "boot memory portion", and the one or more sectors storing the main program and data such as the font data is referred to as the "main memory portion". In addition, data constituting the boot program is referred to as the "boot data", and data constituting the main program, font data, and other data stored in the main memory portion is referred to as the "main data".

It will be further noted that the boot memory portion and main memory portion as used herein may include blocks of plural sectors that are the batch-erasable storage units in the flash memory.

Embodiment 1

Figure 2:
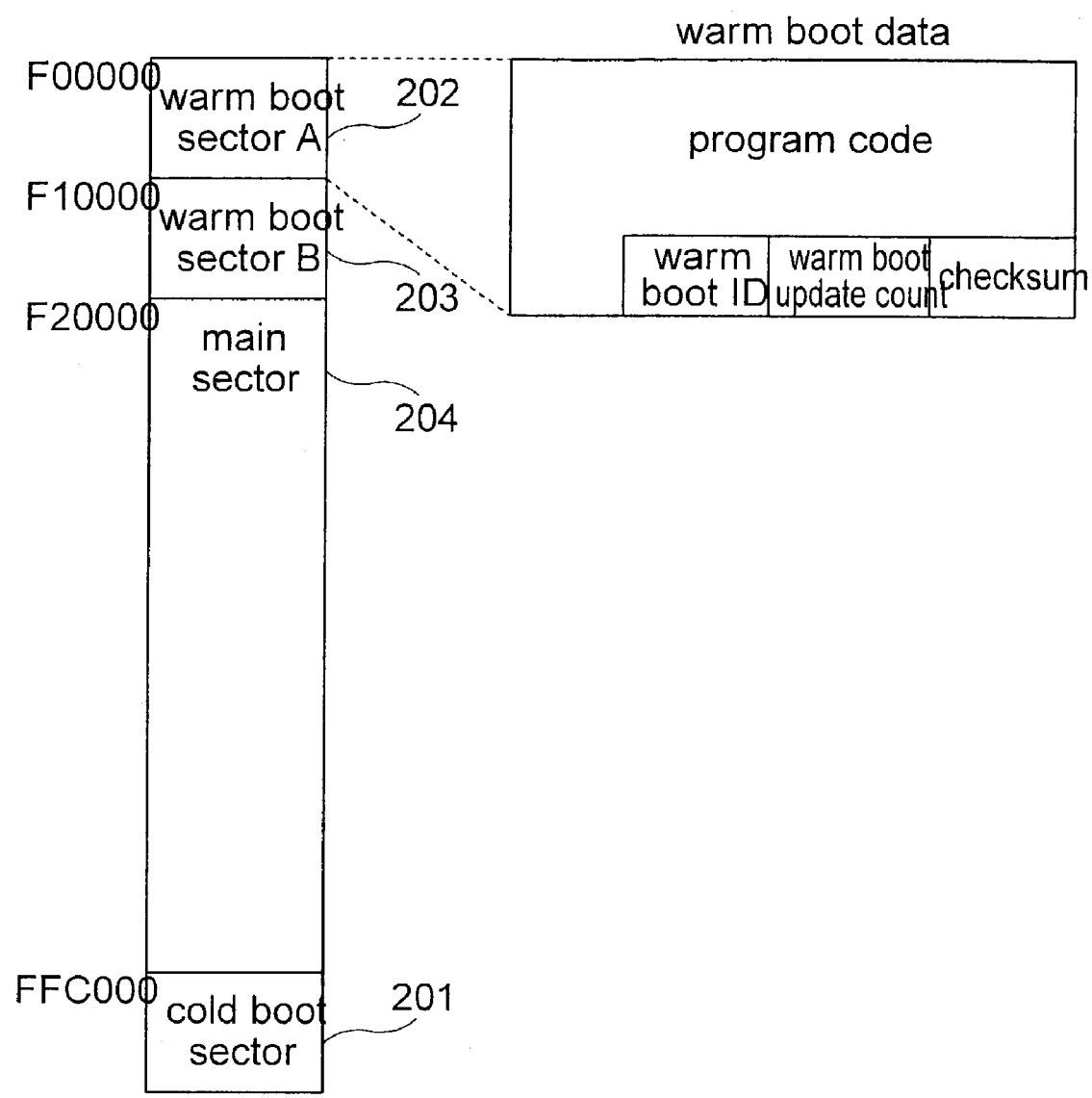
FIG. 2 shows the sector configuration of flash memory of FIG. 1.

FIG. 2 shows an example of the sector configuration of a flash memory device. This configuration is described below using a boot memory portion comprising three sectors by way of example. The three sectors forming the boot memory portion of flash memory 101 are first boot sector 201, a second boot sector 202, and a third boot sector 203. The second and third boot sectors are also hereinafter referred to as the warm boot sectors.

Boot data required to implement the minimum functions needed to boot the electronic device is stored in the first boot sector 201. These minimum functions may include, for example, initializing the CPU 103 and the stack, a write/read test of the RAM 102 and other tests such as a write/read test of a gate array register (not shown), and evaluations such as a boot mode evaluation. The first boot sector 201 is also hereinafter called the "cold boot sector", The data stored in the cold boot sector 201 is called the "cold boot data", and the process run by the cold boot data is called the "cold boot process".

Boot data for performing functions during startup other than the minimum functions required to boot the electronic device in the cold boot process (that is, functions during startup in the memory rewrite mode) and functions for rewriting data in flash memory 101 is stored in second boot sector 202. These functions performed during startup other than the minimum functions include determining the type of communication interface, processes appropriate to the communication interface, and processes invoked by status commands (such as returning the firmware version ID). A process for rewriting main data and boot data stored in sectors other than the cold boot sector 201 and second boot sector 202 (that is, itself) is run by this boot data for executing a function for rewriting data in flash memory 101. Below, this second boot sector 202 is referred to as warm boot sector A. The warm boot data stored in warm boot sector A 202 is called "warm boot data A", and the warm boot process run by warm boot data A is called "warm boot process A".

Boot data substantially identical to warm boot data A for performing functions during startup other than the minimum functions required to boot the electronic device in the cold boot process (that is, functions during startup in the memory rewrite mode) and functions for rewriting data in flash memory 101 is stored in third boot sector 203. A process for rewriting main data and boot data stored in the flash memory 101 in sectors other than the cold boot sector 201 and third boot sector 203 (that is, itself) is run by this boot data for executing a function for rewriting data in flash memory 101. Below, this third boot sector 203 is referred to as warm boot sector B. The warm boot data in warm boot sector B 203 is called "warm boot data B", and the warm boot process run by warm boot data B is called "warm boot process B".

This sector configuration means that the warm boot process run from one warm boot sector rewrites the warm boot data in the other warm boot sector so that at least one warm boot sector is assured of operating normally.

A checksum for verifying each warm boot sector (that is, whether the warm boot data is correctly stored and held in memory), a warm boot update count denoting how many times the warm boot data has been updated, and a warm boot ID for identifying the warm boot sector are also stored in warm boot sectors A 202 and B 203. The checksum and warm boot update count are used to evaluate updated boot data. More specifically, based on the checksum and warm boot update count, the cold boot process finds the warm boot sector storing the most recent normal (i.e., usable) warm boot data, and runs the warm boot process according to the warm boot data stored in that warm boot sector.

Figure 3:
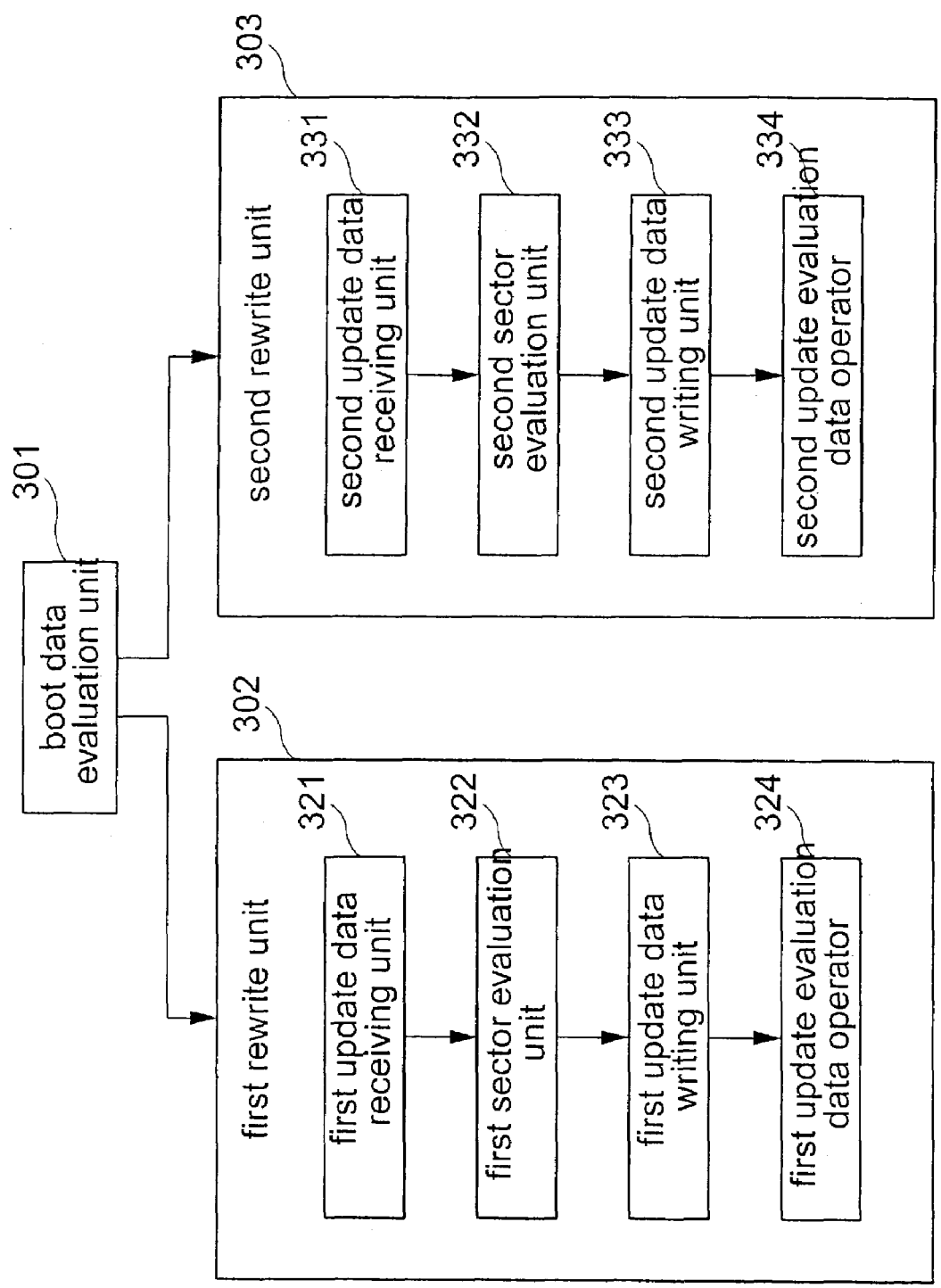
FIG. 3 is a function block diagram relating to the memory rewrite process of the control system.

FIG. 3 shows an example of a function block diagram of the memory rewrite process for the control system 100 which further includes a boot data evaluation unit 301, a first rewrite unit 302, and a second rewrite unit 303.

The first rewrite unit 302 has a first update data receiving unit 321, first sector evaluation unit 322, first update data writing unit 323, and first update evaluation data operator 324. The second rewrite unit 303 has a second update data receiving unit 331, second sector evaluation unit 332, second update data writing unit 333, and second update evaluation data operator 334.

As a function of the cold boot process run according to the cold boot data stored in the cold boot sector 201 shown in FIG. 2, the boot data evaluation unit 301 determines, based on the checksum and warm boot update count stored in warm boot sector A 202 and warm boot sector B 203 as the boot data update evaluation data, whether to run warm boot process A or to run warm boot process B. When the cold boot process is run, a selection is made by the boot data evaluation unit 301 of the boot data to be activated by the cold boot data from the boot data stored in either the warm boot sector A 202 or the warm boot sector B 203.

As a function of warm boot process A, the first rewrite unit 302 can rewrite data stored in sectors in flash memory 101 other than cold boot sector 201 and warm boot sector A 202. The warm boot data B stored in warm boot sector B 203 can therefore be rewritten by first rewrite unit 302.

The first update data receiving unit 321 of first rewrite unit 302 receives update data from a host using a specified communication interface. The update data is transmitted in data units (record units) of a specified size according to a specified format.

The first sector evaluation unit 322 of first rewrite unit 302 determines what sector in flash memory 101 stores the update data received by the first update data receiving unit 321, and does not run the rewrite process using the update data if the data is stored in cold boot sector 201 or warm boot sector A 202.

The first update data writing unit 323 of first rewrite unit 302 writes the update data to the specified (identified) sector in flash memory 101 other than the cold boot sector 201 and warm boot sector A 202.

The first update evaluation data operator 324 of first rewrite unit 302 calculates and updates the checksum of the rewritten warm boot sector B 203 in flash memory 101 and the checksum of the main memory portion 204, and the warm boot update count of the warm boot sector B 203 based on the warm boot update count of warm boot sector A 202.

As a function of warm boot process B, the second rewrite unit 303 can rewrite data stored in sectors in flash memory 101 other than the cold boot sector 201 and warm boot sector B 203. The warm boot data A stored in warm boot sector A 202 can therefore be rewritten by second rewrite unit 303.

The second update data receiving unit 331 of second rewrite unit 303 receives update data from a host using a specified communication interface. The update data is transmitted in data units (record units) of a specified size according to a specified format.

The second sector evaluation unit 332 of second rewrite unit 303 determines what sector in flash memory 101 stores the update data received by the second update data receiving unit 331, and does not run the rewrite process using the update data if the data is stored in cold boot sector 201 or warm boot sector B 203.

The second update data writing unit 333 of second rewrite unit 303 writes the update data to the specified (identified) sector in flash memory 101 other than the cold boot sector 201 and warm boot sector B 203.

The second update evaluation data operator 334 of second rewrite unit 303 calculates and updates the checksum of the rewritten warm boot sector A 202 in flash memory 101 and the checksum of the main memory portion 204, and the warm boot update count of the warm boot sector A 202 based on the warm boot update count of warm boot sector B 203.

Figure 4:
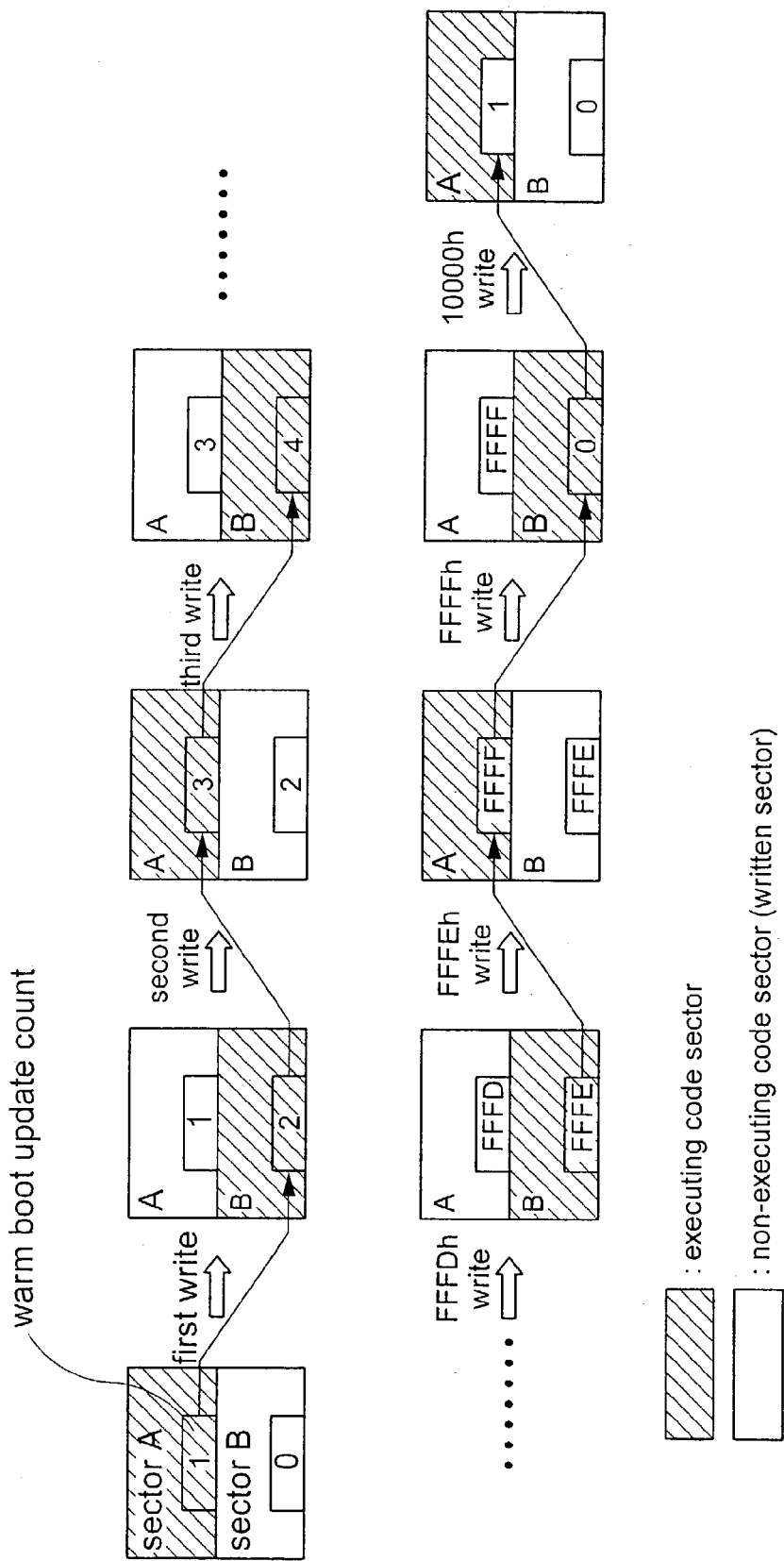
FIG. 4 shows the warm boot data rewrite sequence using two warm boot sectors of the boot memory portion.

FIG. 4 shows the rewrite sequence of warm boot data using two warm boot sectors. An electronic device comprising this control system is shipped with warm boot data A and warm boot data B respectively stored in warm boot sector A 202 and warm boot sector B 203 of flash memory 101. The warm boot update count is initialized to 1 in one warm boot sector and to 0 in the other warm boot sector. For example, the warm boot update count for warm boot sector A 202 is initialized to 1, and the warm boot update count is initialized to 0 for warm boot sector B 203.

Whether the most recent warm boot process run by the cold boot process is warm boot process A or warm boot process B is determined based on the checksum of the warm boot sector area and the warm boot update count in warm boot sector A 202 and warm boot sector B 203. If the checksum is normal for both warm boot sectors A and B, the warm boot process of the warm boot sector with the highest warm boot update count (that is, the most recently written warm boot sector) is run. Furthermore, if the checksum is normal for only warm boot sector A 202 or warm boot sector B 203, the warm boot process of the warm boot sector having a normal checksum is run.

The warm boot process of the selected warm boot sector rewrites the warm boot data in the other (non-selected) warm boot sector, and then updates the warm boot update count. For example, the first time a warm boot sector is rewritten the warm boot process that executes is warm boot process A as shown in FIG. 4. The rewritten warm boot sector is therefore warm boot sector B 203. In other words, warm boot process A updates warm boot data B in warm boot sector B 203.

The warm boot update count for warm boot sector B 203 becomes the warm boot update count of warm boot sector A 202 plus 1. More specifically, the warm boot update count of the updated warm boot sector always becomes greater than the warm boot update count of the warm boot sector from which the warm boot process runs. The only exception to this is when the update count is FFFFh, in which case the next value is 0. In other words when the warm boot update count has been written 10000 h times, it is reset to the shipping (initialized) state.

Figure 5:
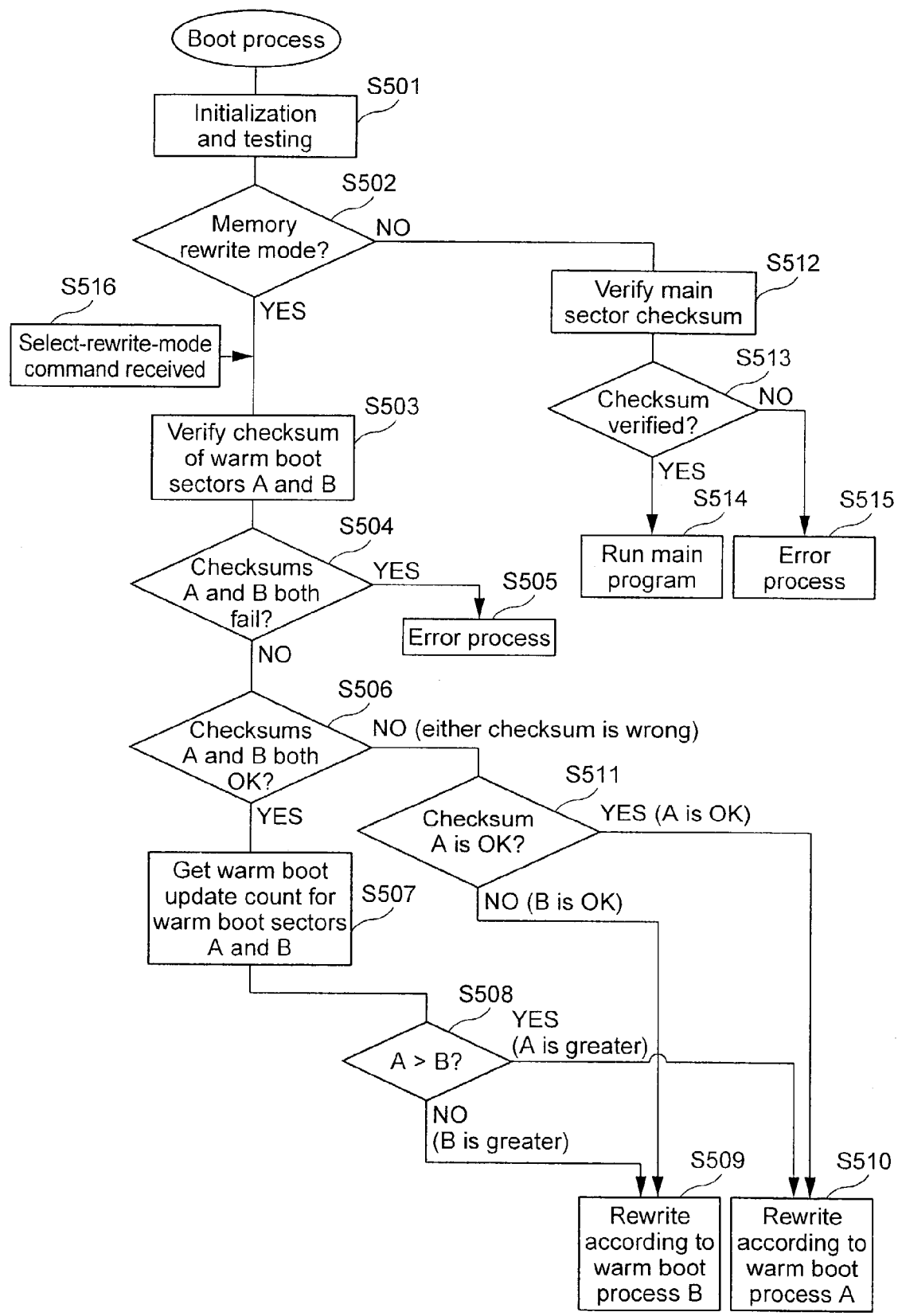
FIG. 5 is a flow chart of the boot process.

FIG. 5 is a flow chart showing an example of the boot process run by the cold boot process from cold boot sector 201, warm boot process A from warm boot sector A 202, and warm boot process B from warm boot sector B 203.

Initialization, including initializing the CPU 103 and stack, tests, including a W/R check of RAM 102 and the gate array registers, and evaluations, including determining the startup mode, is first performed (S501).

Whether the memory rewrite mode is selected is determined by detecting, for example, the state of DIP switches of the electronic device (S502). If the memory rewrite mode is not set, that is, if the normal operating mode is set (S502 returns No), the checksum of the main memory portion 204 is verified (S512) and whether the checksum is correct, that is, whether the data in main memory portion 204 is correct, is determined (S513). If the checksum is wrong (S513 returns No), an error process such as displaying an error message is run (S515). If the checksum is correct (S513 returns Yes), the steps of the main program run in the normal operating mode are executed (S514).

If the memory rewrite mode is set (S502 returns Yes), the checksum of the warm boot sector A 202 and the checksum of warm boot sector B 203 are verified (S503). Whether the checksums of both warm boot sector A 202 and warm boot sector B 203 are in error is determined (S504), and if both checksums are wrong (S504 returns Yes), an error process such as displaying an error message is run (S505).

If S504 returns No, the next step (S506) is to determine whether the checksums for both warm boot sectors A and B are correct. If they are (S506 returns Yes), the warm boot update count of warm boot sector A 202 and the warm boot update count of warm boot sector B 203 are both acquired (S507) and compared (S508).

If the warm boot update count of warm boot sector A 202 is greater than that of warm boot sector B 203 (S508 returns Yes), that is, if warm boot data A is newer than warm boot data B, the flash memory rewrite process is run according to warm boot process A read from warm boot sector A 202 (S510).

However, if the warm boot update count of warm boot sector A 202 is less than that of warm boot sector B 203 (S508 returns No), that is, if warm boot data B was updated more recently than warm boot data A, the flash memory rewrite process is run according to warm boot process B read from warm boot sector B 203 (S509).

If the checksum of any of the warm boot sectors A and B is not correct, that is, if (S506 returns No), whether the checksum of warm boot sector A 202 is correct is determined (S511). If it is (S511 returns Yes), the memory rewrite process is executed according to warm boot process A from warm boot sector A 202 (S510). However, if there is an error with the checksum of warm boot sector A 202 (S511 returns No), this means that the checksum of warm boot sector B 203 is correct and the memory rewrite process runs according to warm boot process B read from warm boot sector B 203 (S509).

The electronic device shifts from the normal operating mode to the memory rewrite mode as a result of receiving a select-rewrite-mode command from the host (S516), and rewrites flash memory content (S503 to S511).

It should be noted that after the initialization and testing step (S501) it is alternatively possible to determine which warm boot process to activate (S503 to S508, S511), determine whether the normal operating mode is set or the memory rewrite mode is set (S502), and have the selected warm boot process activate the process appropriate to that mode, that is, the normal process controlled by the main program (S512 to S515) or the memory rewrite process controlled by the warm boot process (S509, S510). In this case startup process functions for the normal operating mode of the electronic device can also be included in the warm boot process.

Figure 6:
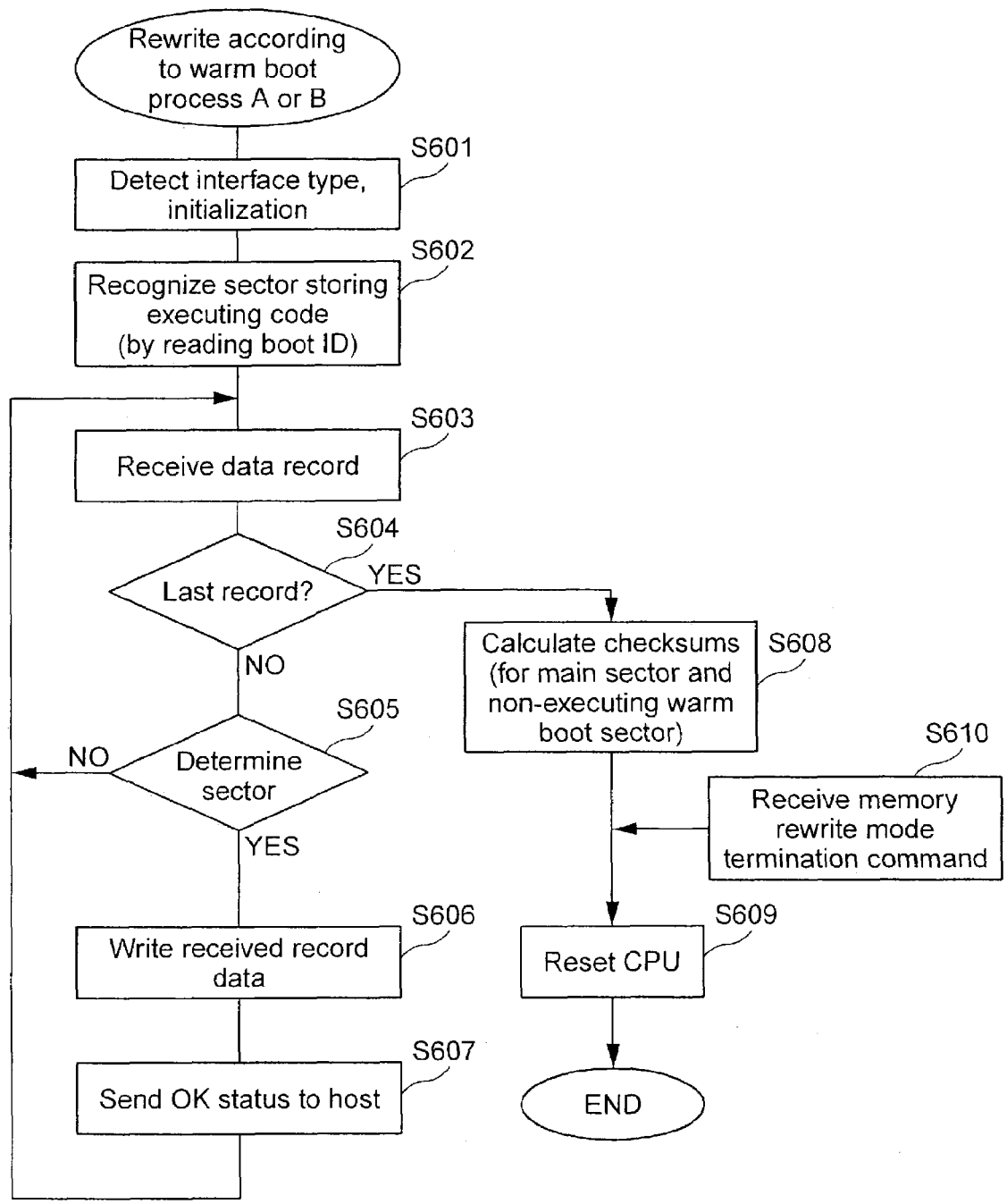
FIG. 6 is a flow chart of a rewrite process using the warm boot process according to a first embodiment of the invention.

FIG. 6 is a flow chart showing an example of the flash memory rewrite process executed by the warm boot processes (A or B) in a first embodiment of this invention. Below the warm boot process being executed will be referred to as the "active warm boot process" and the other warm boot process will be referred to as the "inactive warm boot process". The same attributes active and inactive will be used in a similar way together with the warm boot sector and warm boot data.

First, the type of the communication interface for receiving update data for rewriting flash memory 101 from the host is identified and initialization is completed (S601). The warm boot ID identifying the warm boot process and warm boot sector is then acquired (S602).

The update data is then received in units of one record (S603). A received record of update data is below referred to as the "received record data". Next, whether the received record data is the last record or not, i.e., whether receiving update data ends or not, is then determined (S604).

If the received record data is not the last record (S604 returns No), it is determined if the received record data is update data for the sector of the flash memory that is to store the data (S605). The received record data contains a start address identifying the target sector of the flash memory. This sector may be any sector other than the cold boot sector 201 or the active warm boot sector.

If the received record data is update data for the sector of the flash memory in which it should be stored (S605 returns Yes), a write process is run for the received record data (S606). An OK status report indicating that reception was completed normally is then sent to the host (S607), the procedure loops back to step S603, and the next record of update data is received. If the inactive warm boot sector is rewritten, the warm boot update count is calculated and written.

Assume, for example, data to be stored in the inactive warm boot sector is received. If, after rewriting data to the inactive warm boot sector has started, a record to be stored in a sector other than the inactive warm boot sector is then received, writing to the inactive warm boot sector is known to have ended. The warm boot update count is therefore calculated and written.

However, if the received record data is not update data for the flash memory sector that will store the data (S605 returns No), the received record data is discarded, the process returns to step S603, and the next update data record is received.

If the received record data is the last record (S604 returns Yes), the checksum of the inactive warm boot sector and/or the checksum of the main memory portion 204, where the received record data was written, is calculated and written (S608), the CPU 103 is reset (S609), and the write process ends.

The CPU 103 could be reset (S609) and the memory write process ended when a rewrite mode termination command is received from the host (S610).

The update data sent from the host could be compiled for each individual sector, that is, for warm boot sector A 202, B 203, and main memory portion 204, or it could be a block of update data for any number of multiple sectors. The warm boot update count could also be calculated and written together with the checksum in step S608.

Figure 7:
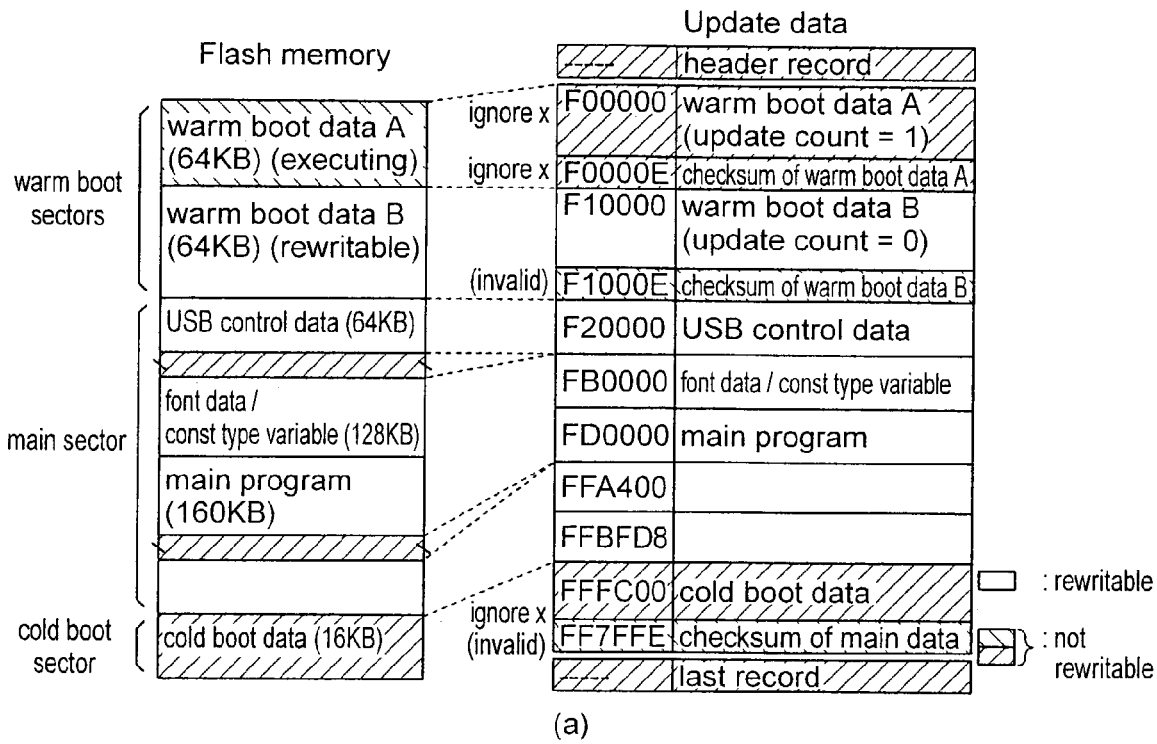
FIG. 7 (a) shows the rewritable flash memory sectors when warm boot process A is executing, and (b) shows the rewritable flash memory sectors when warm boot process B is executing, according to a first embodiment of the invention.
Figure 7:
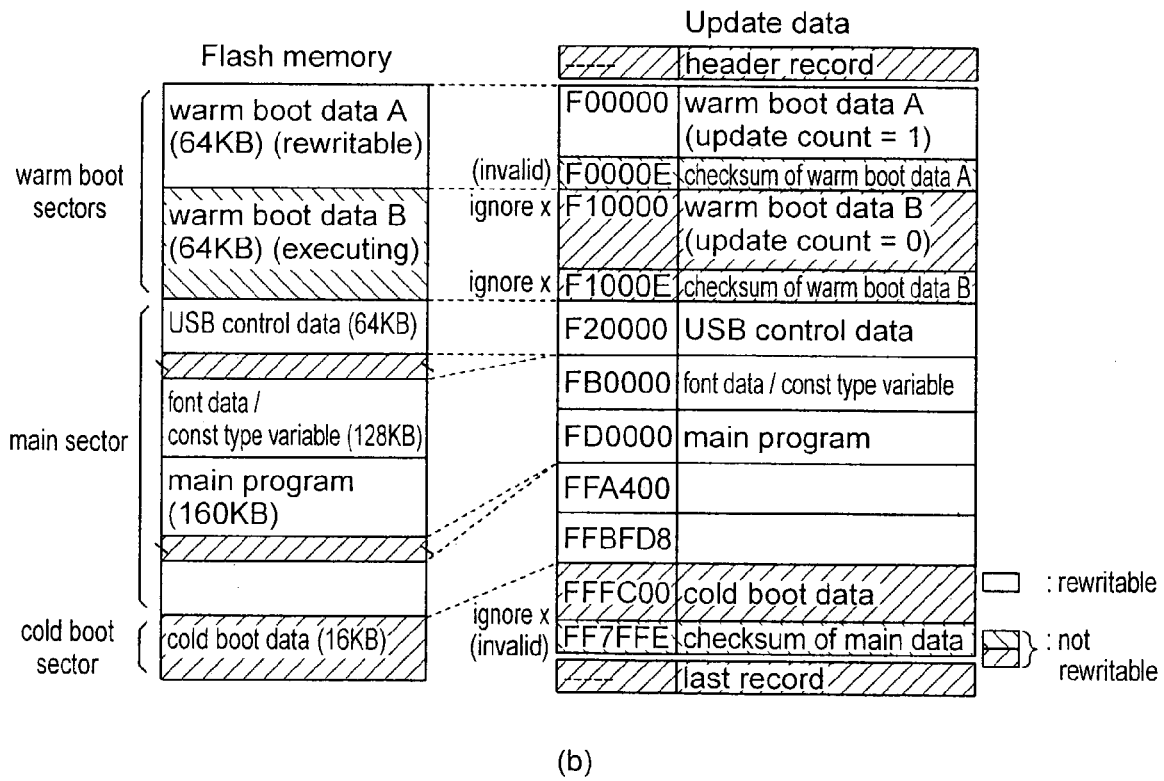

FIG. 7 shows the flash memory rewrite range in this first embodiment of the invention. FIG. 7 (*a*) shows the flash memory rewrite range when the warm boot process A is the active warm boot process, and FIG. 7 (*b*) shows the range when warm boot process B is the active warm boot process. As shown in the figure, data other than the following four types is rewritten based on the received record data.

Cold boot data: boot data that is not rewritten

Active warm boot data in the active warm boot sector: when warm boot process A is running, warm boot data A; when warm boot process B is running, warm boot data B.

Checksum of the inactive warm boot sector: when warm boot process A is running, the checksum of warm boot sector B 203; when warm boot process B is running, the checksum of warm boot sector A 202.

Checksum of main memory portion 204: the checksum of the entire main memory portion.

As noted above the checksum is calculated during a rewrite process controlled by a warm boot process, and the value is written to flash memory (S608).

Various methods can be used for actually rewriting data to flash memory 101. Exemplary methods are described below.

A first rewriting method sequentially receives and rewrites update data for an entire sector as record data in all sectors of the flash memory 101. Record data for unused areas is sent as 0xff. If the received record data is the first update data for the sector to be rewritten (the "update sector"), that is, the received record data will be written to the beginning of the update sector, all data in the update sector is erased and the received record data is written to the update sector based on the start address. If the received record data is not update data written to the beginning of the update sector, the received record data is simply written to the update sector from the location identified by the start address.

To update data in a warm boot sector, a second rewriting method receives update data for the part of the warm boot sector where data is stored and rewrites the entire sector. For sectors other than warm boot sectors, this second method receives only the data that is to be updated, and rewrites only that part corresponding to the received record data.

When a warm boot sector is the update sector the data in the update sector is copied to RAM to produce a sector image, received record data to be updated i.e., used for updating is written to the sector image in RAM, and all data in the update sector is then erased if the received record data is to be written to the beginning of the sector. If the received record data is not the first update data in the update sector, all received record data for parts where there is data is written to the sector image in RAM, and the sector image in RAM is then written back to the update sector.

If a sector other than a warm boot sector is the update sector, all data from the update sector is copied to RAM, received record data for those parts to update is written, all data is erased from the update sector, and the sector image is then written back from RAM to the update sector.

A third rewriting method receives only the data to be updated in all sectors of the flash memory 101, and rewrites only the parts corresponding to the received record data. All data in the update sector is copied to RAM to form a sector image, received record data for the part to be updated is written to the sector image in RAM, all data is then erased from the update sector, and the sector image written to RAM is written back to the update sector.

Figure 8:
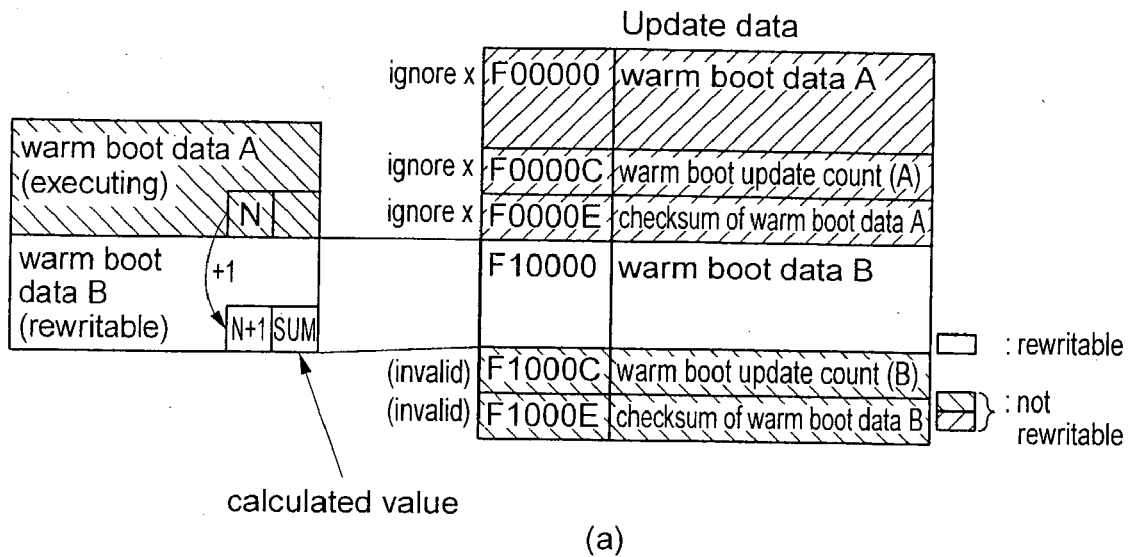
FIG. 8 (a) describes rewriting warm boot sector B when warm boot process A is running, and (b) describes rewriting warm boot sector A when warm boot process B is running.
Figure 8:
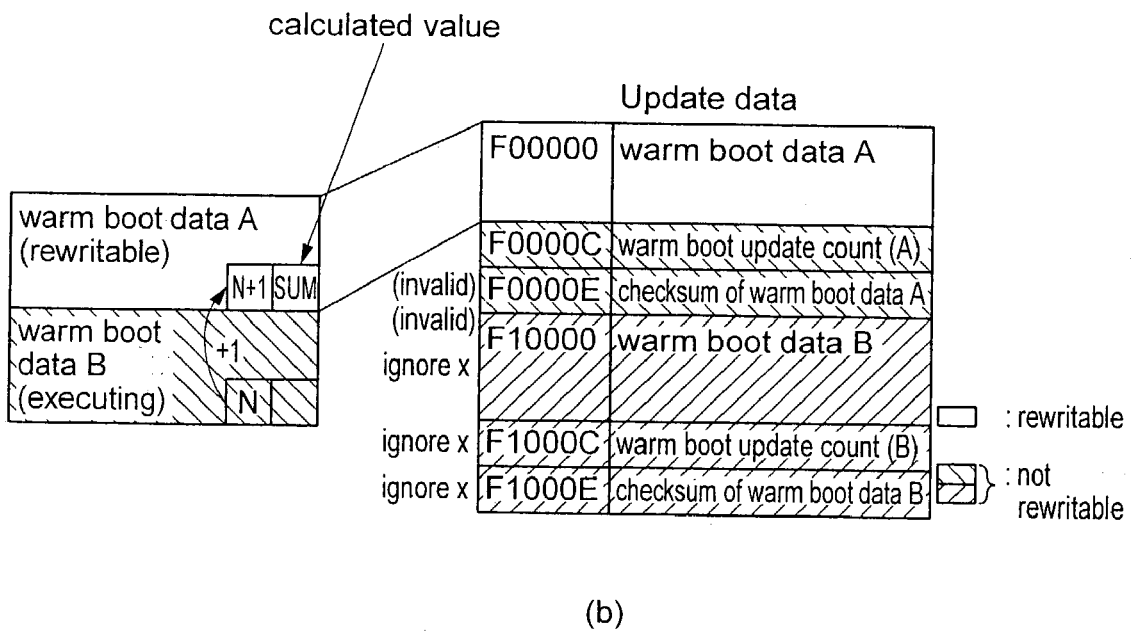

FIG. 8 illustrates details of this warm boot sector rewrite process. FIG. 8 (*a*) shows rewriting warm boot sector B when warm boot process A is executing. FIG. 8 (*b*) shows rewriting warm boot sector A when warm boot process B runs.

As shown in FIG. 8 (*a*), for example, when warm boot process A runs warm boot data B for warm boot sector B 203 is sequentially received and written to warm boot sector B 203 based on the start address of the received record data. The warm boot update count is then calculated for warm boot sector B 203 and written to a specific area in warm boot sector B 203. If the warm boot update count of warm boot sector A 202 is N at this time, the warm boot update count for warm boot sector B 203 becomes (N+1). The checksum of warm boot sector B 203 is then calculated and written to a specific area in warm boot sector B 203.

When warm boot process B runs essentially the same actions occur as when warm boot process A runs as shown in FIG. 8 (*b*). That is, warm boot data A for warm boot sector A 202 is rewritten based on the received record data, and the warm boot update count and checksum of warm boot sector A 202 are calculated and written to memory.

Embodiment 2

This second embodiment of the invention differs from the first embodiment above in that it can rewrite the cold boot sector 201 in addition to warm boot sectors A 202 and B 203 and the main memory portion 204. This difference between the second and first embodiments is described below.

A danger with rewriting the cold boot data stored in the cold boot sector 201 is that a write error, for example, could render the electronic device unbootable. To avoid this problem in the first embodiment above the cold boot sector cannot be rewritten and only warm boot sectors 202, 203 and the main memory portion 204 are rewritable sectors, thereby protecting the cold boot data. This is referred to as the "normal rewrite mode" below. The cold boot process is composed of the minimal functions needed to boot the electronic device, thereby reducing the potential need to rewrite the cold boot data. It may still be necessary to rewrite the cold boot data, however, in order to correct bugs in the cold boot data (startup procedure) or to upgrade the cold boot data.

A control system 100 according to this second embodiment of the invention therefore also provides a cold boot sector rewrite mode so that the cold boot sector 201 can also be rewritten in addition to rewriting warm boot sectors 202, 203 and the main memory portion 204.

When the control system 100 of this second embodiment detects in the update data sent from the host for rewriting data stored in the flash memory 101 indicia for writing specific data of a specific data length to a specific address in flash memory 101, it goes to the cold boot sector rewrite mode. This specific address and specific data can be pre-defined as desired. In this embodiment the specific data is the 7-byte long character code REWRITE. The specific address is 0xF1FFE0 if the process is running from warm boot sector A 202, and is 0xF0FFE0 if the process is running from warm boot sector B 203. Each of these two addresses can be written in one update data record as the specific address for writing data. In this case the cold boot sector rewrite mode can be entered regardless of which warm boot sector will be the active one.

More specifically, warm boot data A stored in warm boot sector A 202 enables rewriting boot data stored in flash memory 101 in sectors other than warm boot sector A 202 itself, and rewriting the main data. Likewise, warm boot data B stored in warm boot sector B 203 enables rewriting boot data stored in flash memory 101 in sectors other than warm boot sector B 203 itself, and rewriting the main data.

Furthermore, as in the first embodiment, by rewriting inactive warm boot data by an active warm boot process, at least one warm boot sector is protected and assured of operating normally.

The first rewrite unit 302 is a function of warm boot process A stored in warm boot sector A 202 (FIG. 2), and can rewrite data stored in any sector in flash memory 101 other than warm boot sector A 202 itself. That is, cold boot data stored in cold boot sector 201, warm boot data B stored in warm boot sector B 203, and main data stored in main memory portion 204 can be rewritten by the first rewrite unit 302.

The first sector evaluation unit 322 determines which sector in flash memory 101 is to store the update data received by the first update data receiving unit 321. If it is warm boot sector A 202, the update data is not written. The received update data is also interpreted to determine whether to move to the cold boot sector rewrite mode. If the cold boot sector rewrite mode is not indicated and the sector to store the update data is the cold boot sector 201, the update data is not written.

Based on the result returned by the first sector evaluation unit 322, the first update data writing unit 323 writes the update data to the specified sector in flash memory 101.

The second rewrite unit 303 is a function of warm boot process B in warm boot sector B 203 (FIG. 2), and can rewrite data stored in any sector in flash memory 101 other than warm boot sector B 203 itself. That is, second rewrite unit 303 can write cold boot data to cold boot sector 201, warm boot data A to warm boot sector A 202, and main data to main memory portion 204.

The second sector evaluation unit 332 determines which sector in flash memory 101 stores the update data received by the second update data receiving unit 331. If it is warm boot sector B 203, the update data is not written. The received update data is also interpreted to determine if the cold boot sector rewrite mode is indicated. If entering the cold boot sector rewrite mode is not indicated and the sector to store the update data is the cold boot sector 201, the update data is not written.

Based on the result returned by the second sector evaluation unit 332, the second update data writing unit 333 writes the update data to the specified sector in flash memory 101.

Figure 9:
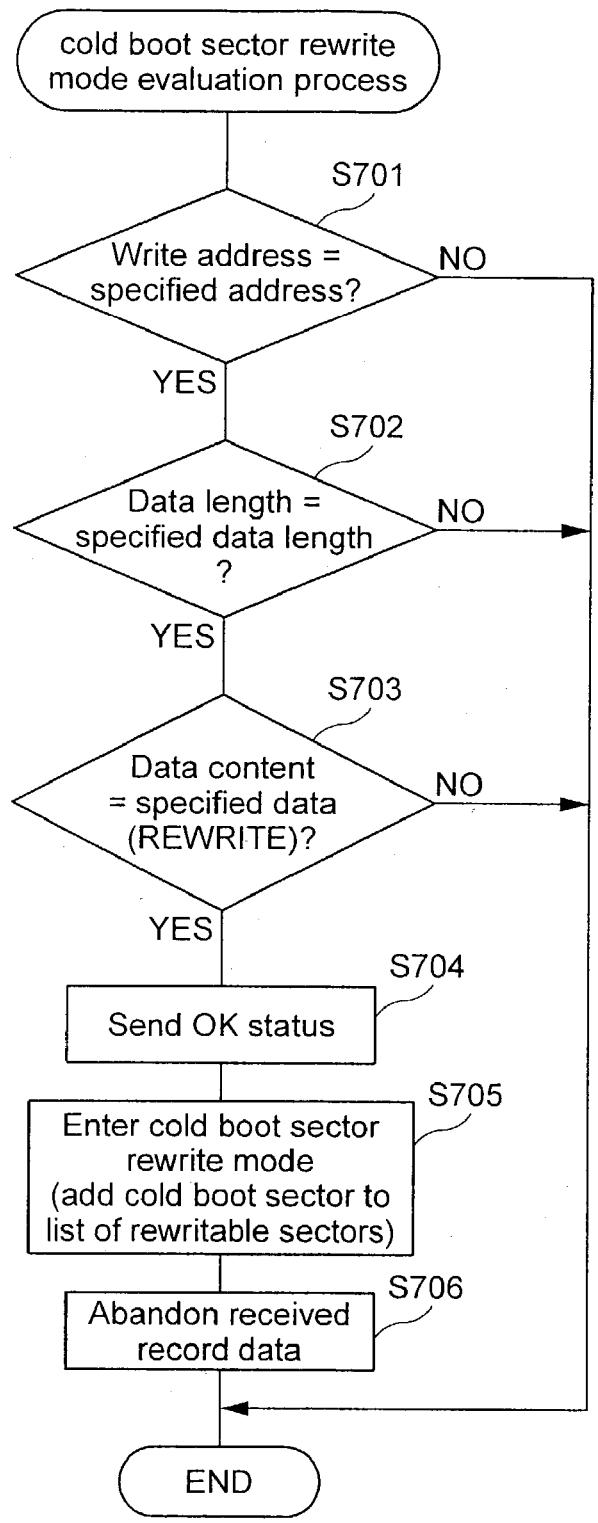
FIG. 9 is a flow chart showing a process for determining whether to enter a cold boot memory portion rewrite mode.

FIG. 9 is a flow chart showing the process for determining whether to move to the cold boot sector rewrite mode. This process determines whether to move from the normal rewrite mode to the cold boot sector rewrite mode, and is run as part of the memory rewrite process (S509, S510) shown in FIG. 5.

First, each record of received update data is analyzed to determine if the write address in the data record is one of the specified addresses (that is, addresses 0xF1FFE0 and 0xF0FFE0 in this embodiment) (S701). If the write address is one of these specified addresses (S701 returns Yes), the next step (S702) is to determine whether the length of the data is the specified data length (7 bytes in this embodiment). If it is (S702 returns Yes), and then the next step (S703) is to determine whether the content of the received record is the specified data (the character codes for REWRITE in this embodiment). If it is (S703 returns Yes), an OK status report indicating that the data was received is sent to the host (S704). A flag for setting the cold boot sector 201 to a rewritable mode in flash memory 101 is then set (S705), and the received data record is discarded (S706).

If the write address is not one of the specified addresses (S701 returns No), or if the record length is not the specified data length (S702 returns No), or if the content is not the specified content (S703 returns No), and this process ends without setting the flag that specifies the cold boot sector 201 is rewritable. In this case the normal rewrite mode is maintained.

Figure 10:
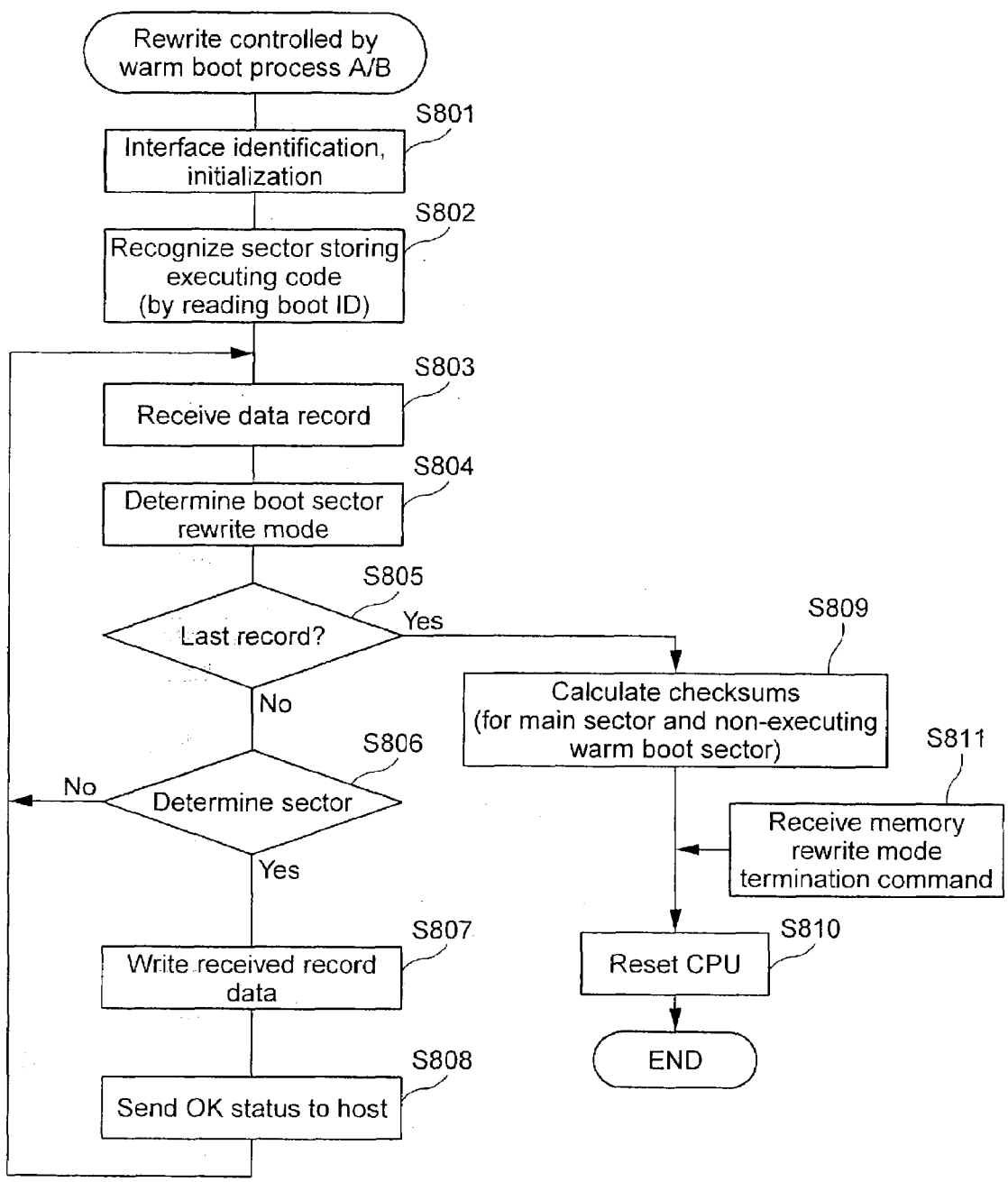
FIG. 10 is a flow chart of a rewrite process using the warm boot process according to a second embodiment of the invention.

FIG. 10 is a flow chart showing an example of a flash memory rewrite process controlled by a warm boot process (A or B) in this second embodiment of the invention. This process is substantially the same as the process of the first embodiment shown in FIG. 6. It differs in that in this second embodiment after a data record is received (S803) the cold boot sector rewrite mode evaluation process shown in FIG. 9 runs (S804). As described more specifically above, it is determined whether the received record data is for writing particular data to a specific address, and the cold boot sector rewrite mode is entered or the normal rewrite mode is maintained based on the result. Steps S805 to S811 are the same as steps S604 to S610 in the first embodiment. In the normal rewrite mode the rewritable sectors are all sectors other than the cold boot sector 201 and the active warm boot sector; in the cold boot sector rewrite mode, all sectors other than the active warm boot sector are rewritable.

If the cold boot sector rewrite mode is activated in step S804, the flag set to enable rewriting the cold boot sector 201 is cleared in the termination process of step S810 so that the cold boot sector 201 cannot be rewritten.

The update data sent from the host can be compiled individually for each sector, that is, cold boot sector 201, warm boot sector A 202 or B 203, and main memory portion 204, or for writing to a desired plurality of sectors.

Figure 11:
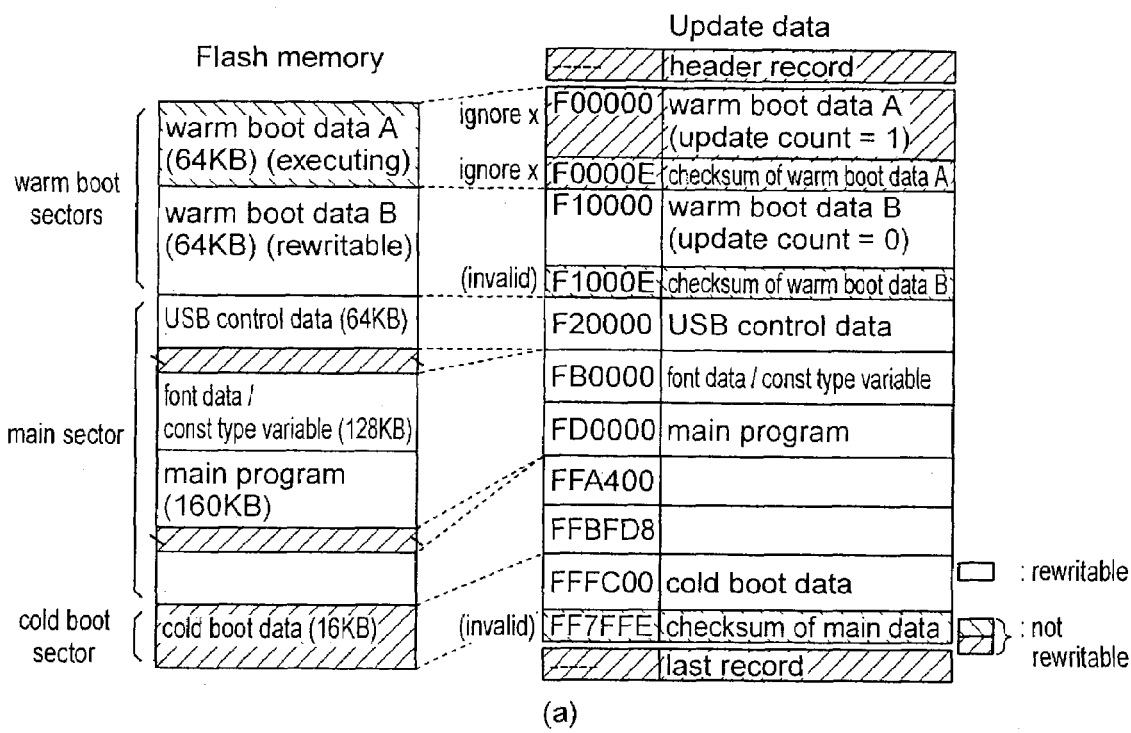
FIG. 11 (a) shows the rewritable flash memory sectors when warm boot process A is executing, and FIG. 11 (b) shows the rewritable flash memory sectors when warm boot process B is executing, according to a second embodiment of the invention.
Figure 11:
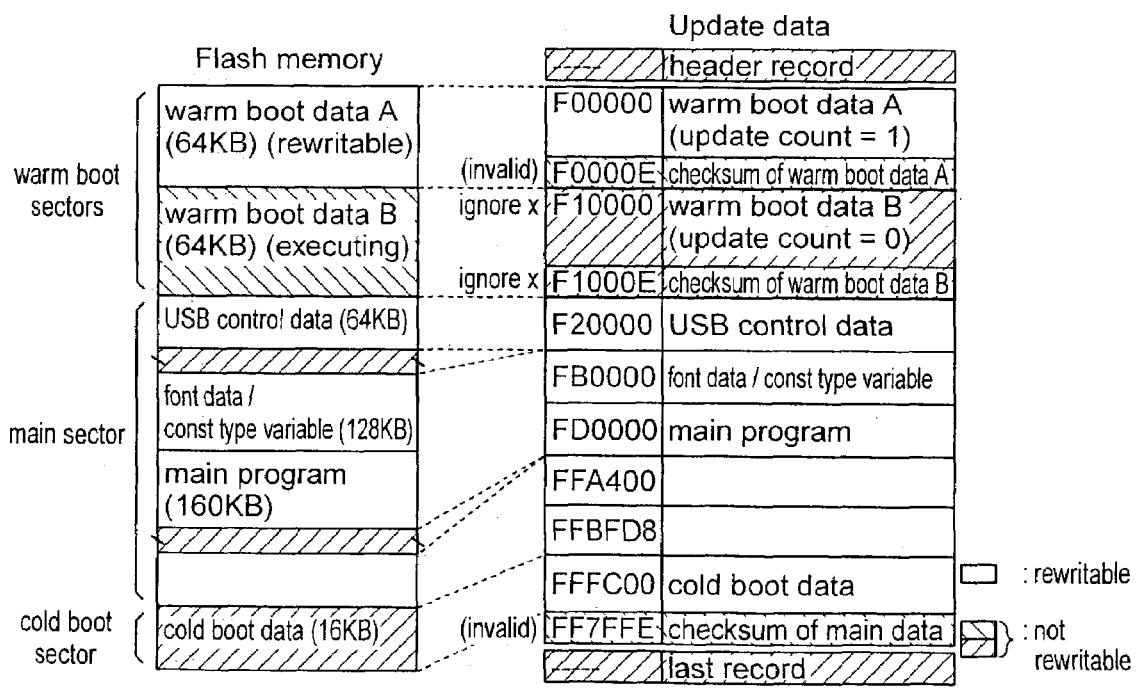
Figure 12:
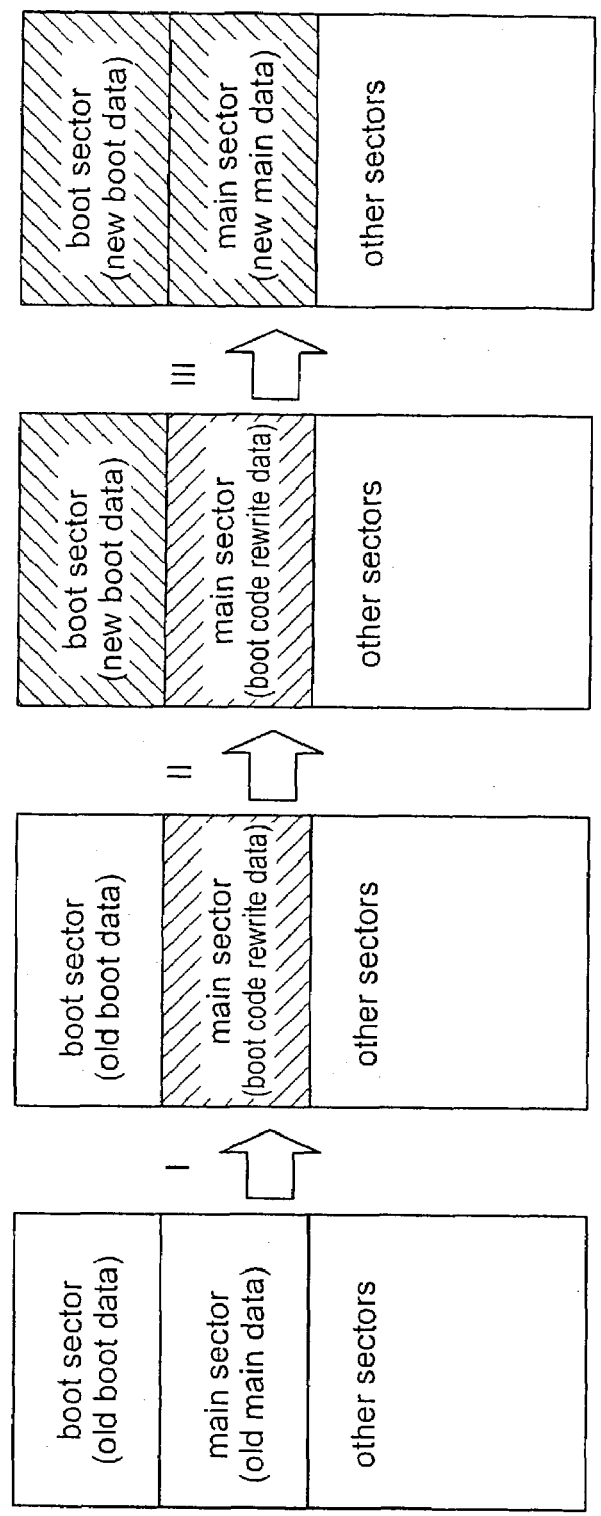
FIG. 12 describes data movement with a conventional rewrite process.

FIG. 11 shows the rewritable flash memory ranges in this second embodiment of the invention. FIG. 11 (a) shows the range that is rewritable when warm boot process A runs, and FIG. 11 (b) shows the range that is rewritable when warm boot process B runs. As shown in the figure, data other than the three types described below are rewritten based on the received record data.

Active warm boot data in an active warm boot sector: when warm boot process A is running, warm boot data A; when warm boot process B is running, warm boot data B.

Checksum of the inactive warm boot sector: when warm boot process A is running, the checksum of warm boot sector B 203; when warm boot process B is running, the checksum of warm boot sector A 202.

Checksum of main memory portion 204: the checksum of the entire main memory portion.

As noted above the checksum is calculated during a rewrite process controlled by a warm boot process, and the value is written to flash memory (S809).

As also noted above, the cold boot data is not included in the rewritable sector range when operating in the normal rewrite mode. This is the same as in the first embodiment.

The present invention can be used when there are three or more warm boot sectors. In this case the cold boot data stored in the cold boot sector can be configured to determine which of the warm boot sectors is to be the active one based on the checksum and warm boot update count, and read and execute the warm boot code from that sector.

As described above, the invention provides a cold boot sector and at least two other boot sectors in flash memory. Cold boot data containing the minimal functions needed to boot the device having the flash memory is stored in the cold boot sector. Boot data for running a function (and functions of the startup process other than the functions contained in the cold boot data) for rewriting flash memory sectors including the cold boot sector but not including the active boot sector is stored in at least two other boot sectors. It is therefore possible to prevent the device from becoming unbootable as a result of boot memory portion rewrite errors. For example, when a new function is added to a boot process that is already functioning normally, the electronic device can be prevented from becoming unbootable due to a write error during the boot data rewrite process by writing boot data for the new function to another warm boot sector as warm boot data.

Furthermore, if it is necessary to rewrite the cold boot data, the cold boot sector can be set to a rewritable state by sending data indicating writing specific data to a specific address in the update data, and the cold boot data can therefore be easily rewritten. It is therefore not necessary to provide a special program for rewriting the cold boot data, and the cold boot data can be rewritten using the same procedure used to rewrite warm boot data and the main data.

The cold boot data, warm boot data, and main data can be rewritten with a single download operation. Operation is thus simplified and the chance of errors occurring is greatly reduced. Less time is also required for the rewrite process.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A control device comprising:
   a CPU;
   a RAM;
   a nonvolatile memory;
   wherein said nonvolatile memory comprises;
   a cold boot sector for storing cold boot data,
   at least a first and second boot sector for storing other boot data including boot update evaluation data with each boot sector having a program process stored therein independent of the program process stored in the other boot sectors for rewriting data in boot sectors other than itself;
   a main memory portion having one or more main sectors for storing main data;
   a boot data evaluation unit including an evaluation data operator for calculating a count value corresponding to the size of the boot update evaluation data stored in at least each of the first and second boot sectors respectively, a program comparator for distinguishing which of the boot sectors has a higher count value and a program selector for selecting a program process from the boot sector having the highest count value for rewriting data in boot sectors other than the boot sector with the highest count value; and
   a rewrite unit responsive to the program process selected by the program selector in the boot data evaluation unit for rewriting data stored in the main memory portion and in a boot sector other than the boot sector which has been recognized as having the highest count value
   wherein the first and second boot sectors do not include main data.

2. The control device of claim 1, wherein the rewrite unit further comprises program means to recognize update evaluation data stored in said boot sectors having a specific data length, content and a specific address to enable data to be rewritten in the cold boot sector in response to the specific data recognized.

3. The control device of claim 1 wherein said first and second boot sectors have indicia means for updating the count value in each of the first and second boot sector corresponding to the number of times said first and second boot sectors have received update data and wherein the indicia means updates the count value in response to the received update data.

4. The control device of claim 3 wherein the initial value of said boot update evaluation data in said first boot sector is assigned a count value of 1 and the initial value of said boot update evaluation data in said second boot sector is assigned a count value of 0, such that in the first rewriting of data the program process in the first boot sector is selected and only data in the second boot sector and main memory portion will be rewritten and the boot update evaluation data in said second boot sector is changed to a numerical count value of 2 and
   in the second rewriting of data the program process is selected from the second boot sector and only data in the first boot sector and main memory portion will be rewritten and the boot update evaluation data in said first boot sector is changed to a numerical count value of 3 representing a count up of 2.

5. The control device of claim 3 wherein the indicia means updates the numerical count value in either the first or second boot sector by a numerical count of 2 in an arrangement such that the numerical count is updated alternately with each additional rewriting of data by a count up of 2.

6. A method for controlling the rewriting of data in a flash memory device comprising a CPU; a RAM; and a nonvolatile memory including a cold boot sector for storing cold boot data, at least a first and second boot sector for storing other boot data including boot update evaluation data and a boot update evaluation data unit wherein each boot sector has stored therein a program process which is independent of the program process stored in the other boot sectors for rewriting data in boot sectors other than itself; and wherein said memory further includes a main memory portion having one or more sectors for storing main memory; the method comprising the steps of:
   (a) calculating a count value corresponding to the size of the boot update evaluation data stored in at least the first and second boot sectors, respectively,
   (b) recognizing which of the boot sectors is higher in count value compared to the count value in the other boot sectors;
   (c) selecting the program process to be used from one of the boot sectors based upon which boot sector is recognized to have the highest count value; and
   (d) using the selected program process of step (c) for rewriting data stored in the main memory portion and in a boot sector other than the boot sector recognized in step (b) as the boot sector having the highest count value.

7. The method of claim 6 further comprising the step of recognizing boot update evaluation data stored in said boot sectors containing a specific data length, content and is at a specific address to enable rewriting data in the cold boot sector.

8. The method of claim 6, further comprising recognizing the number of times each of said first and second boot sectors have been updated by receipt of update data and determining from the recognized cumulative value which boot sector has the highest count value.

9. The method of claim 8 further comprising assigning an initial count value of 1 for the boot update evaluation data in the first boot sector and assigning an initial count value of 0 for the boot update evaluation data in said second boot sector such that
   in the first rewriting of data the program process selected will be initially selected from the first boot sector and only data in the second boot sector and main memory portion will be rewritten;
   increasing the numerical value of the count value for boot update evaluation data in the second boot sector by a numerical value of 2;
   whereby in a second rewriting of data the program process is selected from the second boot sector such that only data in the first boot sector and main memory portion will be rewritten and the boot update evaluation data in said first boot sector is changed to a numerical count value of 3 representing a count up of 2 and for each successive rewriting of data increasing the numerical value of the other of the first and second boot sectors by a numerical count of 2 such that the count value is changed alternately with each additional rewriting of data by a count up of 2.

* * * * *